(12) United States Patent
Nakano et al.

(10) Patent No.: US 9,436,063 B2
(45) Date of Patent: Sep. 6, 2016

(54) BLADE DRIVING DEVICE AND OPTICAL APPARATUS

(71) Applicant: SEIKO Precision Inc., Narashino-shi, Chiba (JP)

(72) Inventors: Yoichi Nakano, Tokyo (JP); Motoharu Sakurai, Chiba (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 14/844,716

(22) Filed: Sep. 3, 2015

(65) Prior Publication Data

US 2016/0077405 A1  Mar. 17, 2016

(30) Foreign Application Priority Data

Sep. 11, 2014  (JP) .................. 2014-185175

(51) Int. Cl.
*G03B 9/40*    (2006.01)
(52) U.S. Cl.
CPC ....................... *G03B 9/40* (2013.01)
(58) Field of Classification Search
CPC ............ G03B 9/08; G03B 9/12; G03B 9/14; G03B 9/16; G03B 9/40; G03B 9/48
See application file for complete search history.

(56) References Cited

U.S. PATENT DOCUMENTS 6,821,033 B2 * 11/2004 Sekizawa ............... H02K 26/00
                                                                310/400

FOREIGN PATENT DOCUMENTS

JP          2014-66760 A       4/2014

* cited by examiner

*Primary Examiner* — WB Perkey
(74) *Attorney, Agent, or Firm* — Brinks Gilson & Lione

(57) ABSTRACT

A blade driving device according to the present invention includes: a substrate having an aperture; a first blade and a second blade which open and close the aperture; a first driving member which drives the first blade; a second driving member which drives the second blade; a first actuator which operates the first driving member; and a second actuator which operates the second driving member, wherein the first actuator and the second actuator extend along a first direction which intersects an axial direction of the aperture on a primary surface of the substrate and are arranged in a second direction which intersects the axial direction and the first direction.

4 Claims, 6 Drawing Sheets

BLADE DRIVING DEVICE AND OPTICAL APPARATUS

RELATED APPLICATIONS

This application claims priority from Japanese Patent Application No. 2014-185175 filed on Sep. 11, 2014, the contents of which are incorporated herein by reference in their entirety.

BACKGROUND OF THE INVENTION

1. Field of the Invention

The present invention relates to a blade driving device and an optical apparatus.

2. Description of the Related Art

For example, an optical apparatus such as a digital camera or a still camera employs a blade driving device provided with a driving member that drives blades.

In Japanese Unexamined Patent Application, First Publication No. 2014-66760, a blade driving device which includes a substrate having an aperture, first and second blades that open and close the aperture, and first and second actuators for driving the first and second blades, in which the first and second actuators respectively include first and second stators, first and second rotors, and first and second coils, and the first and second rotors are arranged so as to interpose at least one of the first and second coils therebetween, is described.

However, in recent years, in order to cope with an increase in the size of the blades due to an increase in the size of the aperture of the substrate or an increase in the speed of the driven blades, an increase in the output of the first and second actuators is required. In order to increase the output of the actuator, there is a need to increase the ampere-turn which is the product of the winding number of the coil and the current value.

However, in the blade driving device described in the related art, when the winding number of the coil is simply increased in order to realize an increase in the output, the electric wire length of the coil is increased and the resistance is also increased, resulting in a reduction in the winding efficiency. In addition, thickening of the coil occurs, and thus the thickness of the blade driving device is increased. In particular, in a recent optical apparatus, a reduction in the thickness has been required. Therefore, there is an object to suppress an increase in the thickness while realizing an increase in the output of the blade driving device.

SUMMARY OF THE INVENTION

The present invention has been made taking the foregoing circumstances into consideration, and an object thereof is to provide a blade driving device capable of suppressing an increase in size while realizing an increase in output, and an optical apparatus provided with the blade driving device.

In order to solve the above-described problem, according to an aspect of the present invention, a blade driving device is provided including: a substrate having an aperture; a first blade and a second blade which open and close the aperture; a first driving member which drives the first blade; a second driving member which drives the second blade; a first actuator which operates the first driving member; and a second actuator which operates the second driving member, in which the first actuator and the second actuator extend along a first direction which intersects an axial direction of the aperture on a primary surface of the substrate and are arranged in a second direction which intersects the axial direction and the first direction.

According to the present invention, since the first actuator and the second actuator extend along the first direction and are arranged in the second direction, compared to the related art, coils of the first actuator and the second actuator can be increased in length in the first direction while suppressing an increase in the size of the blade driving device in the first direction. Accordingly, even in a case where the number of turns of the coils of the first actuator and the second actuator is increased, compared to the related art, thickening of the coils can be suppressed, and thus an increase in the size of the blade driving device can be suppressed while realizing an increase in the output thereof.

Further, at least one of the first driving member and the second driving member may be disposed to overlap an end portion of at least one of the first actuator and the second actuator when viewed in the axial direction.

According to the present invention, by disposing the at least one driving member of the first driving member and the second driving member to overlap the end portion of at least one actuator of the first actuator and the second actuator when viewed in the axial direction, even in a case where the coils are lengthened in the first direction, an increase in the size of the blade driving device in the first direction and the second direction can be suppressed.

Therefore, an increase in the size of the blade driving device can be suppressed while realizing an increase in the output thereof.

Further, the first actuator may include a first rotor, the second actuator may include a second rotor, and a first speed governing mechanism may be interposed between the first rotor and the first blade, and a second speed governing mechanism may be interposed between the second rotor and the second blade.

According to the present invention, since the first speed governing mechanism is interposed between the first rotor and the first blade and the second speed governing mechanism is interposed between the second rotor and the second blade, the driving speed and the driving torque of the first and second blades can be simply set only by changing the first speed governing mechanism and the second speed governing mechanism. In particular, in a case where the first speed governing mechanism and the second speed governing mechanism are gears, only by setting the number of teeth of the first speed governing mechanism and the number of teeth of the second speed governing mechanism, the driving speed and the driving torque of the first and second blades can be simply set. Therefore, the blade driving device can be provided with an excellent degree of freedom in design.

In addition, an optical apparatus of the present invention includes the above-described blade driving device.

According to the present invention, the optical apparatus which is capable of opening and closing the aperture at a high speed and has a small thickness and high performance can be obtained.

According to the present invention, since the first actuator and the second actuator extend along the first direction and are arranged in the second direction, compared to the related art, coils of the first actuator and the second actuator can be increased in length in the first direction while suppressing an increase in the size of the blade driving device in the first direction. Accordingly, even in a case where the number of turns of the coils of the first actuator and the second actuator is increased, compared to the related art, thickening of the coils can be suppressed, and thus an increase in the size of the blade driving device can be suppressed while realizing an increase in the output thereof.

DETAILED DESCRIPTION OF THE PREFERRED EMBODIMENTS

Hereinafter, an embodiment of the present invention will be described with reference to the drawings. Hereinafter, after an optical apparatus is described first, a blade driving device according to the embodiment of the present invention will be described.

Figure 1:
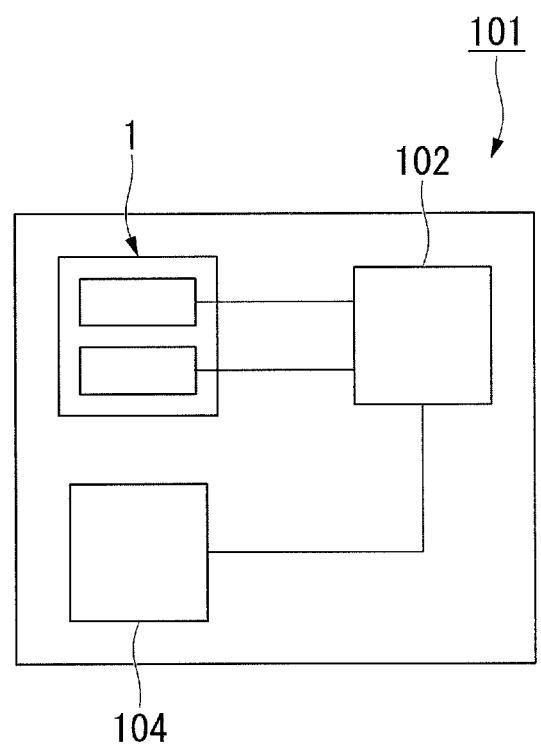
FIG. 1 is a schematic configuration diagram of an optical apparatus.

FIG. 1 is a block diagram of an optical apparatus.

As illustrated in FIG. 1, an optical apparatus 101 is, for example, a digital camera or a still camera, and includes a blade driving device 1, a controller 102, and an imaging device 104.

The controller 102 controls the overall operations of the optical apparatus 101 and includes a CPU, a ROM, a RAM, and the like.

The controller 102 controls the operations of the blade driving device 1, which will be described later.

The imaging device 104 is, for example, a CCD or a CMOS, and converts the object image formed by light into an electrical signal.

In addition, the optical apparatus 101 includes, although not illustrated in FIG. 1, a lens for adjusting the focal length, and the like.

Subsequently, the blade driving device 1 according to the embodiment of the present invention will be described.

Figure 2:
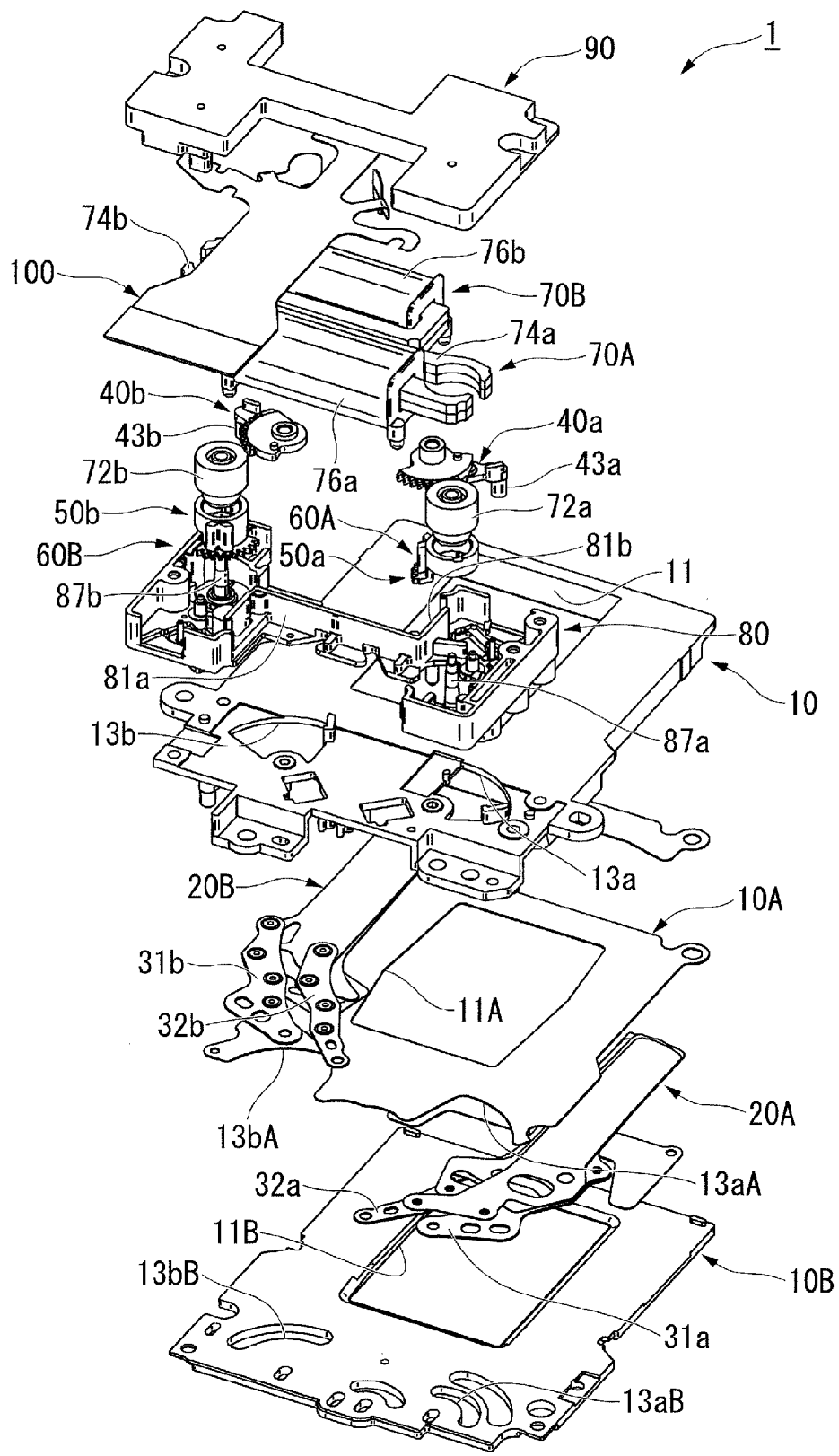
FIG. 2 is an exploded perspective view of a blade driving device according to an embodiment.
Figure 3:
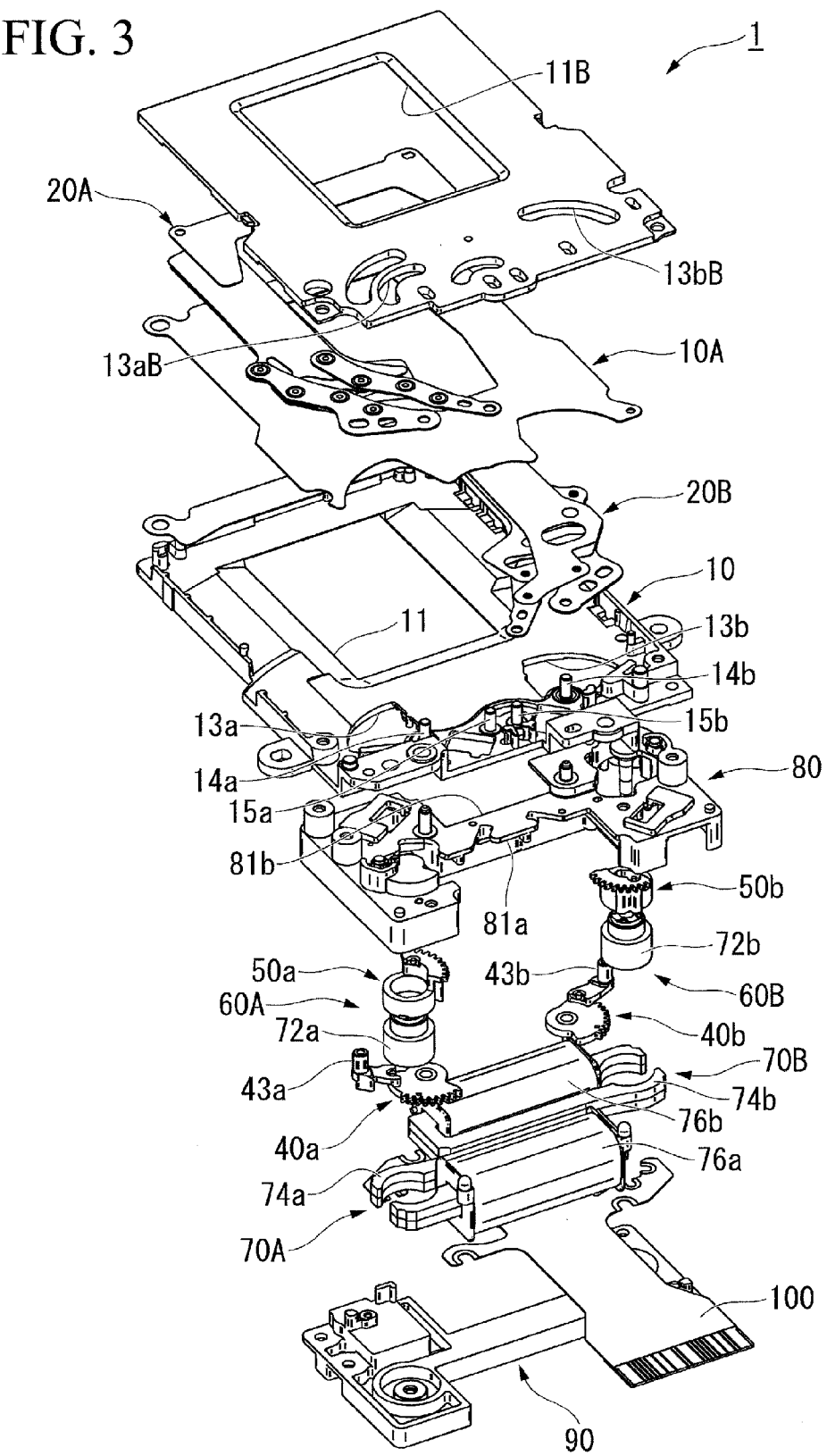
FIG. 3 is an exploded perspective view of the blade driving device according to the embodiment.

FIGS. 2 and 3 are exploded perspective views of the blade driving device according to this embodiment.

The blade driving device 1 is also called a focal-plane shutter.

As illustrated in FIGS. 2 and 3, the blade driving device 1 is employed by the optical apparatus 101 (see FIG. 1) such as a digital camera or a still camera.

The blade driving device 1 includes substrates 10, 10A, and 10B, a leading blade 20A (corresponding to a "first blade" in the claims), a trailing blade 20B (corresponding to a "second blade" in the claims), arms 31*a*, 32*a*, 31*b*, and 32*b*, a first actuator 70A, a second actuator 70B, and the like. The substrates 10, 10A, and 10B respectively include apertures 11, 11A, and 11B. The apertures 11, 11A, and 11B are formed in a substantially rectangular shape in a plan view. The leading blade 20A and the trailing blade 20B open and close the apertures 11, 11A, and 11B. The first actuator 70A drives the leading blade 20A. The second actuator 70B drives the trailing blade 20B.

Each of the leading blade 20A and the trailing blade 20B is constituted by a plurality of blades. The leading blade 20A and the trailing blade 20B can be transited from an overlapped state where the plurality of blades overlap one another to an expanded state where the plurality of blades are expanded. The plurality of blades are retreated from the aperture 11 in the overlapping state to allow the aperture 11 to be fully opened, and close the aperture 11 in the expanded state to allow the aperture 11 to be fully closed. In FIGS. 2 and 3, the blade driving device 1 in the fully opened state is illustrated.

The leading blade 20A is connected to the arms 31*a* and 32*a*. The trailing blade 20B is connected to the arms 31*b* and 32*b*. As illustrated in FIG. 3, the arms 31*a*, 32*a*, 31*b*, and 32*b* are rotatably supported by shafts 14*a*, 15*a*, 14*b*, and 15*b* provided on the substrate 10.

A first driving member 40*a* and a second driving member 40*b* respectively drive the arms 31*a* and 31*b*. The first driving member 40*a* and the second driving member 40*b* are provided with driving pins 43*a* and 43*b* which are respectively connected to the arms 31*a* and 31*b*. The substrates 10, 10A, and 10B are respectively provided with escape portions 13*a*, 13*a*A, and 13*a*B for retreating the movement of the driving pin 43*a*, and are respectively provided with escape portions 13*b*, 13*b*A, and 13*b*B for retreating the movement of the driving pin 43*b* in the same manner. The first driving member 40*a* and the second driving member 40*b* will be described later.

Holders 80 and 90 which hold the first actuator 70A and the second actuator 70B are assembled to the substrate 10. In the holder 80, accommodation portions 81*a* and 81*b* which can accommodate the first actuator 70A and the second actuator 70B are formed. The holders 80 and 90 are formed of, for example, a synthetic resin material. The holder 80 is fixed to the substrate 10. The holders 80 and 90 are fixed to each other by, for example, a tapping screw or snap-fit (not illustrated).

The first actuator 70A is constituted by a first rotor 72*a* which is rotatably supported by the holder 80, a stator 74*a* which is excited to generate a magnetic force between the first rotor 72*a* and the stator 74*a*, and a leading blade coil 76*a* for exciting the stator 74*a*. A first output member 50*a*, which will be described later in detail, is fitted to the first rotor 72*a*. The first output member 50*a* is connected to the first driving member 40*a*. Accordingly, as the first rotor 72*a* is rotated, the first output member 50*a* and the first driving member 40*a* are driven, so that the arm 31*a* and the leading blade 20A are driven.

The second actuator 70B is constituted by a second rotor 72*b* which is rotatably supported by the holder 80, a stator 74*b* which is excited to generate a magnetic force between the second rotor 72*b* and the stator 74*b*, and a trailing blade coil 76*b* for exciting the stator 74*b*. The trailing blade 20B is driven by the second actuator 70B in the same manner as the leading blade 20A. That is, as the second rotor 72*b* of the second actuator 70B is rotated, a second output member 50*b* and the second driving member 40*b* are driven, so that the arm 31*b* and the trailing blade 20B are driven.

In the holder 80, shaft portions 87*a* and 87*b* which rotatably support the first rotor 72*a* and the second rotor 72*b*, respectively, are formed. A printed board 100 is fixed to the upper portion of the holder 90. The printed board 100 supplies power to the leading blade coil 76*a* of the first actuator 70A, and the trailing blade coil 76*b* of the second actuator 70B.

Figure 4:
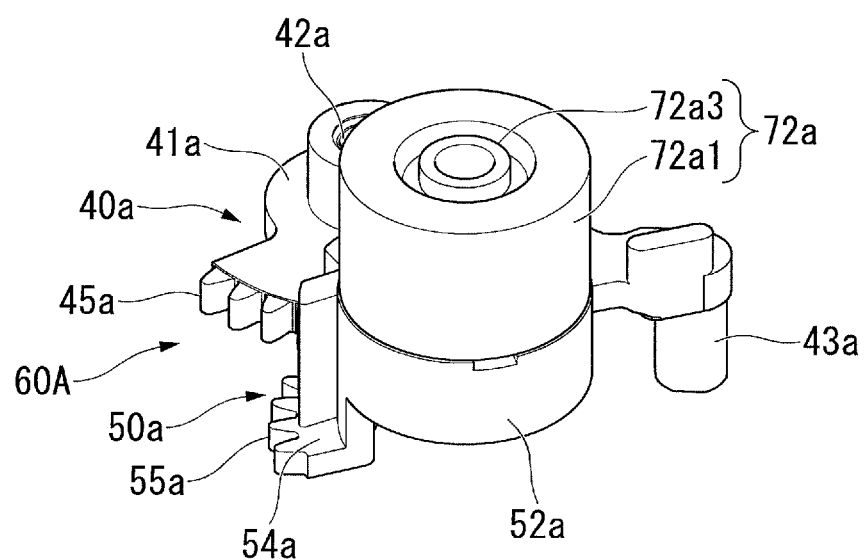
FIG. 4 is an enlarged view of a first rotor, a first driving member, and a first output member.

FIG. 4 is an enlarged view of the first rotor 72*a*, the first driving member 40*a*, and the first output member 50*a*. In addition, FIG. 4 illustrates a state where the first rotor 72*a*, the first driving member 40*a*, and the first output member 50*a* are assembled to the blade driving device 1 (see FIG. 2).

As illustrated in FIG. 4, the first driving member 40a includes a plate-shaped arm portion 41a, a support hole 42a which is formed at one end of the arm portion 41a to function as the fulcrum of rotation, and a driving pin 43a which is formed at the other end of the arm portion 41a and extends in a predetermined direction. In addition, a gear portion 45a is formed in the outer peripheral edge of the arm portion 41a.

The first rotor 72a includes a cylindrical portion 72a3, and a ring-shaped permanent magnet 72a1 to which the cylindrical portion 72a3 is fitted. The permanent magnet 72a1 is magnetized with different polarities in the peripheral direction thereof.

The permanent magnet 72a1 is fitted with the upper portion of the cylindrical portion 72a3 so as not to be rotatable. The permanent magnet 72a1 and the cylindrical portion 72a3 are formed integrally with each other.

The first output member 50a is fitted with the lower portion of the cylindrical portion 72a3 so as not to be rotatable. The first output member 50a rotates along with the first rotor 72a.

The first output member 50a includes a cylindrical portion 52a which has a substantially cylindrical shape to which the cylindrical portion 72a3 is fitted, a protrusion 54a which protrudes radially outward from the cylindrical portion 52a, and a gear portion 55a formed at the tip end of the protrusion 54a. The gear portion 55a of the first output member 50a engages with the gear portion 45a of the first driving member 40a. Accordingly, the power of the first output member 50a is transmitted to the first driving member 40a. Here, by changing the gear ratio of the gear portion 55a of the first output member 50a and the gear portion 45a of the first driving member 40a, the rotational speed of the first driving member 40a can be controlled. That is, the gear portion 55a of the first output member 50a and the gear portion 45a of the first driving member 40a correspond to a first speed governing mechanism 60A interposed between the first rotor 72a and the leading blade 20A.

In addition, a gear portion 45b (see FIG. 6) of the second driving member 40b and a gear portion 55b (see FIG. 6) of the second output member 50b engage with each other between the second rotor 72b and the trailing blade 20B.

The gear portion 45b of the second driving member 40b and the gear portion 55b of the second output member 50b correspond to a second speed governing mechanism 60B interposed between the second rotor 72b and the rear curtain 20B. The second speed governing mechanism 60B has the same configuration as that of the first speed governing mechanism 60A, and thus the detailed description thereof will be omitted.

Figure 5:
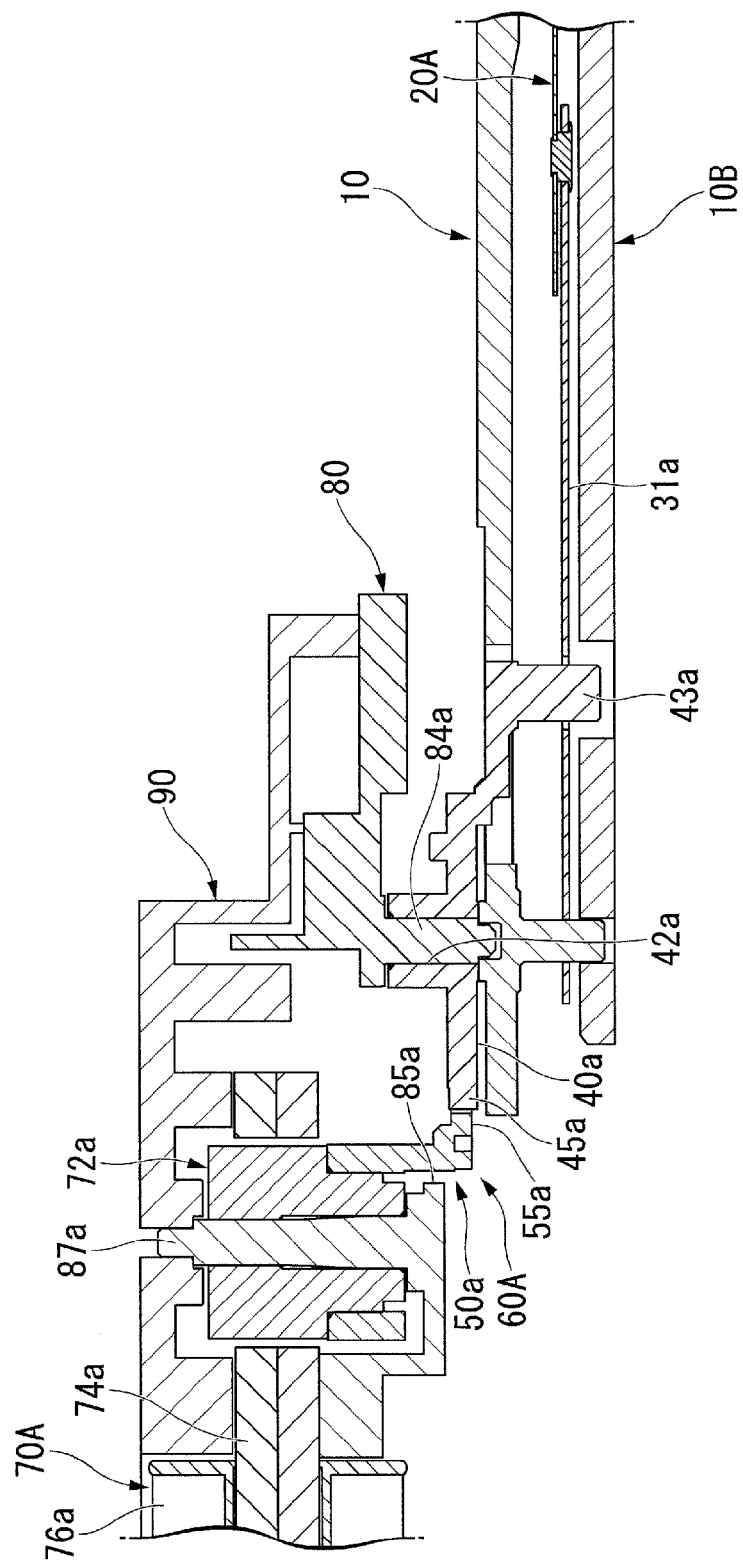
FIG. 5 is a sectional view of the vicinity of a leading blade, the first driving member, the first output member, and a first actuator.

FIG. 5 is a sectional view of the vicinity of the leading blade 20A, the first driving member 40a, the first output member 50a, and the first actuator 70A. In addition, FIG. 5 is a sectional view when the blade driving device 1 is viewed in a direction perpendicular to the axial direction of the aperture 11. In FIG. 5, for easy understanding, the illustration of components is appropriately omitted.

As illustrated in FIG. 5, a shaft 84a of the holder 80 is rotatably inserted into the support hole 42a of the first driving member 40a. Accordingly, the first driving member 40a is rotatably supported.

Therefore, the support hole 42a corresponds to a support portion which rotatably supports the first driving member 40a. The driving pin 43a extends in a predetermined direction and is connected to the arm 31a disposed between the substrates 10 and 10B. As described above, the arm 31a is connected to the leading blade 20A. Connection of the first output member 50a and the first driving member 40a is ensured via an escape hole 85a. Specifically, the gear portions 45a and 55a are positioned in the escape hole 85a.

Subsequently, the arrangement of the first actuator 70A and the second actuator 70B of the blade driving device 1 will be described.

Figure 6:
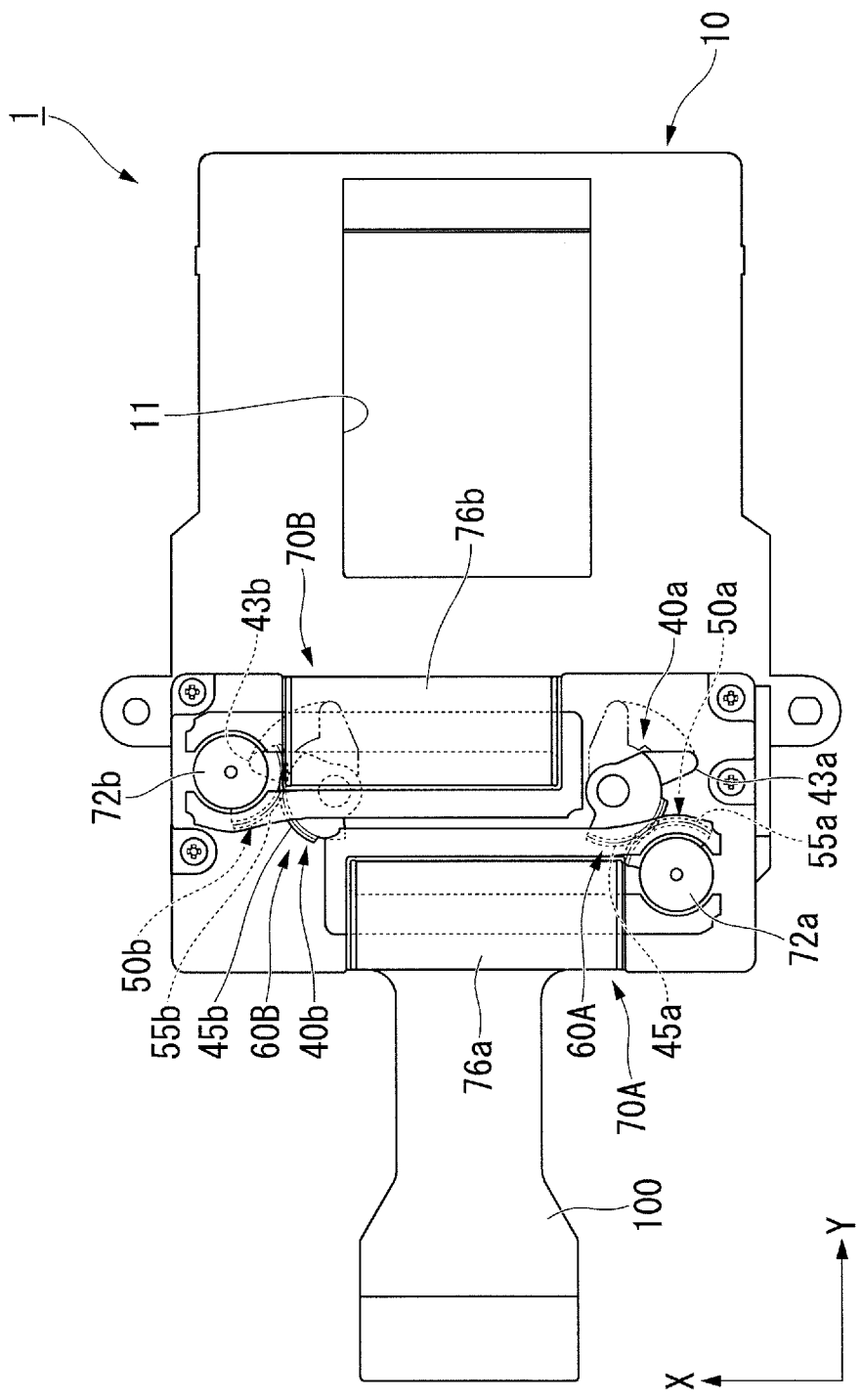
FIG. 6 is a plan view of the blade driving device when viewed in an axial direction of an aperture.

FIG. 6 is a front view of the blade driving device 1. In FIG. 6, for easy understanding, the illustration of a portion of the components in the blade driving device 1 is appropriately omitted. In addition, for convenience, portions of the first actuator 70A, the second actuator 70B, and the peripheral components thereof are penetrated in the illustration. In the following description, a direction which is perpendicular to the axial direction (a direction through the front and rear surfaces of the figure) of the aperture 11 on the primary surface of the substrate 10 and follows the short side direction of the aperture 11 formed in a rectangular shape in the plan view is defined as a first direction X, and a direction perpendicular to the axial direction of the aperture 11 and the first direction X is defined as a second direction Y.

As illustrated in FIG. 6, the lengths of the first actuator 70A and the second actuator 70B are shorter than the length of the substrate 10 in the first direction X.

The first actuator 70A and the second actuator 70B extend along the first direction X in a position adjacent to the aperture 11. In addition, the first actuator 70A and the second actuator 70B are arranged in parallel to each other with a predetermined gap therebetween in the second direction Y.

However, a recent blade driving device requires an increase in the sizes of the leading blade and the trailing blade due to an increase in the size of the aperture, requires an increase in the output to cope with an increase in the speed of the leading blade and the trailing blade which are driven, and requires a reduction in the thickness to cope with a small-size optical apparatus. Contrary to this, in the blade driving device 1 of this embodiment, the first actuator 70A and the second actuator 70B extend along the first direction X and are arranged in the second direction Y. Therefore, compared to the related art, the leading blade coil 76a of the first actuator 70A and the trailing blade coil 76b of the second actuator 70B can be increased in length in the first direction X while suppressing an increase in the size of the blade driving device 1 in the first direction X. Furthermore, by lengthening the leading blade coil 76a of the first actuator 70A and the trailing blade coil 76b of the second actuator 70B in the first direction X, thickening of the leading blade coil 76a and the trailing blade coil 76b is suppressed, and thus a reduction in the thickness of the blade driving device 1 in the thickness direction of the blade driving device 1, that is, in the axial direction of the aperture 11 can be achieved. As described above, in the blade driving device 1 of this embodiment, an increase in the size can be suppressed while realizing an increase in the output, compared to the related art.

In addition, in the blade driving device 1 of this embodiment, the first rotor 72a of the first actuator 70A is disposed closer to the outside of the substrate 10 in the first direction X than an end portion of the second actuator 70B on the opposite side of the second rotor 72b. In addition, the second rotor 72b of the second actuator 70B is disposed closer to the outside of the substrate 10 in the first direction X than an end portion of the first actuator 70A on the opposite side of the first rotor 72a. That is, while the first actuator 70A and the second actuator 70B are arranged adjacent to each other in parallel to each other, the first rotor 72a and the second rotor 72b are disposed to be sufficiently distant from each other. Accordingly, the first rotor 72a and the second rotor 72b are prevented from magnetically affecting each other and affecting operational characteristics thereof. Therefore, desired operational characteristics of the leading blade 20A and the trailing blade 20B can be properly ensured.

For example, an exposure operation is performed as follows. From a state in which the leading blade 20A closes the aperture 11, the trailing blade 20B retreats from the aperture 11, and the first rotor 72a and the second rotor 72b are stopped, the first rotor 72a starts rotating and the leading blade 20A retreats from the aperture 11 to open the aperture 11. Thereafter, the second rotor 72b starts rotating and the trailing blade 20B closes the aperture 11. As described above, during the exposure operation, timings at which the first rotor 72a and the second rotor 72b start rotating are different from each other. Therefore, for example, while one of the first rotor 72a and the second rotor 72b is rotated, the other is in a stopped state. Accordingly, in a case where the first rotor 72a and the second rotor 72b are adjacent to each other, the magnetic field is changed due to the rotation of one of the first rotor 72a and the second rotor 72b, and there is concern that the other of the first rotor 72a and the second rotor 72b may be affected. Specifically, due to an effect of a change in the magnetic field of the first rotor 72a which starts rotating first, the rotation starting timing of the second rotor 72b is changed, and there is concern that this may cause variations in duration from the start of the opening of the aperture 11 by the leading blade 20A to the full closure of the aperture 11 by the trailing blade 20B, that is, an exposure duration. However, as described above, in this embodiment, since the first rotor 72a and the second rotor 72b are sufficiently distant from each other, the operational characteristics of the first rotor 72a and the second rotor 72b are prevented from being affected.

Moreover, the second driving member 40b of the blade driving device 1 of this embodiment is disposed to overlap the end portion of the second actuator 70B when viewed in the axial direction. Specifically, the second driving member 40b is disposed to overlap the second actuator 70B in the vicinity of the second rotor 72b of the second actuator 70B. Accordingly, even in a case where the trailing blade coil 76b of the second actuator 70B is lengthened in the first direction X, an increase in the size of the blade driving device 1 in the first direction X and the second direction Y is suppressed.

In addition, the gear ratio of the gear portion 45a and the gear portion 55a is set so that the rotational speed of the first driving member 40a is faster than the rotational speed of the first output member 50a. That is, the pitch circle diameter of the gear portion 45a is set to be greater than the pitch circle diameter of the gear portion 55a. In addition, the gear ratio of the gear portion 45b and the gear portion 55b is set so that the rotational speed of the second driving member 40b is faster than the rotational speed of the second output member 50b. Accordingly, the first driving member 40a and the second driving member 40b can be rotated at a higher speed than the rotational speeds of the first rotor 72a and the second rotor 72b. Therefore, the movement speeds of the leading blade 20A and the trailing blade 20B can be enhanced. Even by this, the shutter speed of the optical apparatus 101 is increased.

According to this embodiment, since the first actuator 70A and the second actuator 70B extend along the first direction X and are arranged side by side in the second direction Y, compared to the related art, the leading blade coil 76a of the first actuator 70A and the trailing blade coil 76b of the second actuator 70B can be increased in length in the first direction X while suppressing an increase in the size of the blade driving device 1 in the first direction X. Accordingly, even in a case where the number of turns of the leading blade coil 76a of the first actuator 70A and the trailing blade coil 76b of the second actuator 70B is increased, compared to the related art, thickening of the leading blade coil 76a and the trailing blade coil 76b can be suppressed, and thus an increase in the size of the blade driving device 1 can be suppressed while realizing an increase in the output thereof.

In addition, since the second driving member 40b is disposed to overlap the end portion of the second actuator 70B when viewed in the axial direction, even when the trailing blade coil 76b is lengthened in the first direction X, an increase in the size of the blade driving device 1 in the first direction X and the second direction Y can be suppressed.

Therefore, an increase in the size of the blade driving device 1 can be suppressed while realizing an increase in the output thereof.

In addition, since the first speed governing mechanism 60A is interposed between the first rotor 72a and the leading blade 20A and the second speed governing mechanism 60B is interposed between the second rotor 72b and the trailing blade 20B, the driving speed and the driving torque of the leading blade 20A and the trailing blade 20B can be simply set only by changing the numbers of teeth or the sizes of the gear portions 45a and 55a constituting the first speed governing mechanism 60A and the gear portions 45b and 55b constituting the second speed governing mechanism 60B. Therefore, the blade driving device 1 can be provided with an excellent degree of freedom in design.

According to this embodiment, by including the above-described blade driving device 1, the optical apparatus 101 which is capable of opening and closing the aperture 11 at a high speed and has a small thickness and high performance can be obtained.

In addition, the present invention is not limited to the embodiment described above with reference to the drawings, and various modification examples are considered in the technical scope thereof.

In the above-described embodiment, the leading blade 20A is operated by the first actuator 70A and the trailing blade 20B is operated by the second actuator 70B. However, the trailing blade 20B may also be operated by the first actuator 70A and the leading blade 20A may also be operated by the second actuator 70B.

In addition, in the above-described embodiment, the second driving member 40b is disposed to overlap the end portion of the second actuator 70B when viewed in the axial direction. Contrary to this, the first driving member 40a may also be disposed to overlap the end portion of the first actuator 70A when viewed in the axial direction.

Furthermore, constituent elements in the above-described embodiments may be appropriately substituted with well-known constituent elements without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A blade driving device comprising:
a substrate having an aperture;

a first blade and a second blade which open and close the aperture;
a first driving member which drives the first blade;
a second driving member which drives the second blade;
a first actuator which operates the first driving member, the first actuator including a first rotor; and
a second actuator which operates the second driving member, the second actuator including a second rotor,
wherein the first actuator and the second actuator extend along a first direction which intersects an axial direction of the aperture on a primary surface of the substrate and are arranged on a same side of the aperture in a second direction which intersects the axial direction and the first direction,
wherein the first rotor of the first actuator is disposed closer to an outer perimeter of the substrate along the first direction than an end portion of the second actuator opposite the second rotor and the second rotor of the second actuator is disposed closer to the outer perimeter of the substrate along the first direction than an end portion of the first actuator opposite the first rotor.

2. The blade driving device according to claim 1, wherein at least one of the first driving member and the second driving member is disposed to overlap an end portion of at least one of the first actuator and the second actuator when viewed in the axial direction.

3. The blade driving device according to claim 1, wherein a first speed governing mechanism is interposed between the first rotor and the first blade, and a second speed governing mechanism is interposed between the second rotor and the second blade.

4. An optical apparatus comprising:
a blade driving device comprising:
   a substrate having an aperture;
   a first blade and a second blade which open and close the aperture;
   a first driving member which drives the first blade;
   a second driving member which drives the second blade;
   a first actuator which operates the first driving member, the first actuator including a first rotor; and
   a second actuator which operates the second driving member, the second actuator including a second rotor, wherein
the first actuator and the second actuator extend along a first direction which intersects an axial direction of the aperture on a primary surface of the substrate and are arranged on a same side of the aperture in a second direction which intersects the axial direction and the first direction,
wherein the first rotor of the first actuator is disposed closer to an outer perimeter of the substrate along the first direction than an end portion of the second actuator opposite the second rotor and the second rotor of the second actuator is disposed closer to the outer perimeter of the substrate along the first direction than an end portion of the first actuator opposite the first rotor.

* * * * *